United States Patent
Wang et al.

(10) Patent No.: US 8,697,188 B2
(45) Date of Patent: Apr. 15, 2014

(54) POLYURETHANE SYSTEMS HAVING NON-SAG AND PAINTABILITY

(75) Inventors: Chia L. Wang, Shakopee, MN (US); John M. Davis, Bloomington, MN (US); Bryan Lienke, Farmington, MN (US)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 13/558,408

(22) Filed: Jul. 26, 2012

(65) Prior Publication Data

US 2013/0059082 A1 Mar. 7, 2013

Related U.S. Application Data

(60) Provisional application No. 61/530,570, filed on Sep. 2, 2011.

(51) Int. Cl.
| | | |
|---|---|---|
| C08L 75/04 | (2006.01) | |
| B05D 3/12 | (2006.01) | |
| B05D 1/36 | (2006.01) | |
| C08G 18/32 | (2006.01) | |
| B05D 1/28 | (2006.01) | |
| C09D 5/16 | (2006.01) | |

(52) U.S. Cl.
USPC ..... 427/277; 427/369; 427/407.1; 427/427.4; 427/428.01; 427/429; 523/122; 524/590; 528/59; 528/60

(58) Field of Classification Search
None
See application file for complete search history.

(56) References Cited

U.S. PATENT DOCUMENTS

| | | | |
|---|---|---|---|
| 4,043,982 A | | 8/1977 | O'Sullivan et al. |
| 4,283,480 A | * | 8/1981 | Davies et al. ............... 430/270.1 |
| 4,444,976 A | * | 4/1984 | Rabito ............................. 528/60 |
| 4,546,166 A | * | 10/1985 | Niinomi et al. ................. 528/60 |
| 4,728,710 A | * | 3/1988 | Goel ................................ 528/58 |
| 4,743,672 A | | 5/1988 | Goel |
| 5,002,806 A | | 3/1991 | Chung |
| 5,288,797 A | | 2/1994 | Khalil et al. |
| 5,654,085 A | | 8/1997 | Markusch et al. |
| 5,770,673 A | | 6/1998 | Markusch et al. |
| 6,265,517 B1 | | 7/2001 | Stuart |
| 6,723,821 B2 | | 4/2004 | Smith |
| 7,056,415 B2 | | 6/2006 | Meckel |
| 7,288,677 B2 | | 10/2007 | Lee et al. |
| 2001/0051219 A1 | | 12/2001 | Peter et al. |
| 2004/0096668 A1 | | 5/2004 | Peter et al. |
| 2004/0198900 A1 | * | 10/2004 | Madaj ........................... 524/589 |
| 2004/0254292 A1 | | 12/2004 | Williams |
| 2006/0217567 A1 | | 9/2006 | Lee et al. |
| 2007/0055038 A1 | | 3/2007 | Gimmnich et al. |
| 2008/0004406 A1 | | 1/2008 | Lee et al. |
| 2008/0033210 A1 | | 2/2008 | Lee et al. |
| 2008/0185098 A1 | | 8/2008 | Wu et al. |
| 2008/0194788 A1 | | 8/2008 | Lee et al. |

FOREIGN PATENT DOCUMENTS

| | | |
|---|---|---|
| WO | WO 01/72864 A1 | 10/2001 |
| WO | WO 02/062864 A2 | 8/2002 |
| WO | WO 2006/104528 A1 | 10/2006 |

OTHER PUBLICATIONS

PCT/EP2012/064664—International Search Report, mailed Mar. 21, 2013.
PCT/EP2012/064664—Written Opinion, mailed Mar. 21, 2013.
PCT/EP2012/064667—Written Opinion of the International Searching Authority, Oct. 29, 2012.
PCT/EP2012/064667—International Search Report, Oct. 29, 2012.

* cited by examiner

*Primary Examiner* — Randy Gulakowski
*Assistant Examiner* — Jeffrey Washville
(74) *Attorney, Agent, or Firm* — Curatolo Sidoti Co., LPA; Joseph G. Curatolo; Salvatore A. Sidoti

(57) ABSTRACT

A two part construction sealant or adhesive is provided with the properties of non-sag, low modulus, high elongation, and good paint adhesion. The sealant or adhesive is prepared using at least one of a secondary amine or an acrylate monomer, and a diol, triol and/or tetrol having a nominal weight average molecular weight of between 1,000 and 6,000 in the base component of the formulation, and aromatic diisocyanate monomer or polyisocyanate and an isocyanate terminated prepolymer of aromatic diisocyanate or polyisocyanate and polyol in the activator component, the components of Part A to Part B mixed at a weight ratio of 5:1 to 1.8:1.

18 Claims, No Drawings

POLYURETHANE SYSTEMS HAVING NON-SAG AND PAINTABILITY

CROSS REFERENCE TO RELATED APPLICATIONS

The present application claims the benefit of U.S. Provisional Patent Application Ser. No. 61/530,570, filed Sep. 2, 2011 pursuant to 35 U.S.C. §119(e), incorporated herein by reference.

Polyurethanes have suitable properties for many useful products, including elastomeric sealants prepared from the reaction of hydroxy-functional components with isocyanate-functional components. Polyurethanes have utility as high performance sealants having high elongation and low modulus are suitable for commercial building and construction for exterior sealing.

It is desirable that that the sealant or adhesive exhibit non-sag characteristics, i.e., be substantially free from or resistant to sagging or slumping after application to vertical substrate surfaces. The known methods of enhancing the non-sag properties of polyurethane sealant or adhesive formulations can have drawbacks. Non-sag additives, such as polyamines, primary or secondary amines and diamines, are reactive with isocyanate groups, and therefore, polyurethane products formulated with such additives have limited storage stability which impacts their usefulness. Other methods of improving non-sag performance include using castor oil, amide or other thixotropic products. However, the non-sag properties of such formulations can be adversely affected after high shear force mixing, and such formulations have short "pot-life" or working time due to the very high reactivity of most amine compounds towards isocyanates. Incorporating fillers to increase the sag resistance also increases the viscosity of the components containing the filler and makes it difficult to mix the components and then spread the composition on a substrate. It is known to add urea paste prepared by mixing aromatic isocyanate and a primary amine, such as butylamine, into one-part or two-part systems for non-sag and adhesion performance, and for its increased tolerance to more shear force. However, urea paste is difficult to manufacture, requires high speed grinding during the preparation step to remove grainy particles, and represents an additional step in the process.

Thus, the need exists for a high performance, two part construction sealant or adhesive that exhibits sag resistance immediately upon mixing the two parts, Part A (Base) and Part B (activator), thus creating urea paste immediately and saving the time and expense of an initial urea paste preparation step. There is also a need for a non-sag, two part construction sealant or adhesive in which the base and activator components have sufficiently low viscosity for easy mixing, and which upon mixing the base and activator do not result in the mixture having a grainy surface. What is desired in the art are two part construction sealants and adhesives that exhibit paintability, and that are low modulus and have high elongation with high movement capability.

Short chain diols and triols may be added to sealant formulations for good paint adhesion, but have resulted in sealants with poor elongation, strong tensile strength and high modulus. Long chain diols and triols are useful in preparing low modulus sealants, but result in very poor paint adhesion.

Two component polyurethane systems were not previously known, having non-sag, low modulus, high elongation, good tensile properties, and good paint adhesion properties of at least about 3B when tested according to ASTM D3359 and a non-sag value of between about 0.0-0.1 B/S when tested according to ASTM D-2202.

A two part construction sealant or adhesive is provided comprising a base component Part A and an activator component Part B, wherein Part A comprises at least one of a secondary amine or an acrylate monomer, and a diol, triol and/or tetrol having a nominal weight average molecular weight of between 1,000 and 6,000; and Part B comprises an aromatic diisocyanate monomer or polyisocyanate and an isocyanate terminated prepolymer of aromatic diisocyanate or polyisocyanate and polyol; the components of Part A to Part B provided to be mixed at a weight ratio of 5:1 to 1.8:1; wherein the construction sealant or adhesive exhibits a paint adhesion of at least about 3B when tested according to ASTM D3359; a non-sag value of about 0.0-0.1 B/S when tested according to ASTM D-2202; and at least one of the following: a 100% modulus of less than about 830 kPa (120 psi) in the presence of a plasticizer when tested according to ASTM D412; a tensile strength of about 620 kPa (90 psi) or greater when tested according to ASTM D412; or an elongation to break of about 250% or greater when tested according to ASTM D412.

For purposes of illustration but not by way of limitation, the secondary amine may comprise at least one of piperazine, ethylenediamine, naphthalenediamine or mixtures thereof. In certain embodiments, the secondary amine may have a molecular weight in the range of 60 to 250, and in some embodiments up to about 220. In certain embodiments, the secondary amine comprises piperazine. Secondary amines have slower reactivity than primary amines, allowing easier control of the in situ formation of urea paste in the reaction product after mixing Parts A and B together. The amount of secondary amine that may be used may be about 0.3% to about 1.2%, in certain embodiments about 0.6% to about 0.8% by weight. based on the total weight of Part A and Part B components.

For purposes of illustration but not by way of limitation, the acrylate monomer may comprise at least one of trimethylol propane triacrylate, triacrylate, mixtures of triacrylate and diacrylate, or mixtures thereof. In certain embodiments, the acrylate monomer is trimethylol propane triacrylate. The amount of acrylate monomer that may be used may be about 2% to about 6%, in certain embodiments about 3% to about 4% by weight, based on the total weight of Part A and Part B components.

The diol, triol or tetrol has a nominal weight average molecular weight of between 1,000 and 6,000, in certain embodiments, between 3.000 and 6,000. For purposes of illustration but not by way of limitation, the diol, triol or tetrol having a nominal weight average molecular weight of between 1,000 and 6.000 may be a polyether or a polyester triol or tetrol. In certain embodiments, the diol, triol or tetrol having a nominal weight average molecular weight of between 1,000 and 6,000 comprises at least one primary hydroxyl terminated polyol. In certain embodiments, Part A comprises an additional diol or triol or tetrol having a nominal weight average molecular weight of between 400 and 6,000. The amount of polyol that may be used in Part A may be about 25% to about 45%, in certain embodiments about 30% to about 40% by weight, based on the total weight of Part A components.

The molecular weight may be a weight average molecular weight which may be calculated by a formula based on gel permeation chromatography (GPC).

The diol, triol or tetrol having a nominal weight average molecular weight of between 1,000 and 6,000 may comprise at least one of polyether polyol, propoxylated ethylenediamine polyol, polypropylene glycol, propylene oxide adduct of glycerine, amine-based polyether polyol, or mixtures thereof.

In certain embodiments, suitable diols, triols or tetrols may comprise, but are not limited to, Pluracol® 726 and Pluracol® P1010, which are commercially available from BASF Corporation. Pluracol® 726 polyol is a 3,000 molecular weight propylene oxide adduct of glycerin having a nominal functionality of 3, and a hydroxyl number of 57-59, available from BASF Corporation, Wyandotte, Mich. Pluracol® P1010 polyol is a 1000 molecular weight polypropylene glycol formed by adding propylene oxide to a propylene glycol nucleus, having a nominal functionality of 2, and a hydroxyl number of 102-112 available from BASF Corporation, Wyandotte, Mich. In certain embodiments, the diol or triol or tetrol having a nominal weight average molecular weight of between 1,000 and 6,000 may comprise Multranol 9168, a polyether polyol from Bayer Material Science, LLC having a molecular weight of 3,740 and a functionality of 4. In certain embodiments, the triol is Pluracol® 220 from BASF Corporation (Wyandotte, Mich.), a 6000 nominal molecular weight primary hydroxyl terminated polyol, having a nominal functionality of 3 and a hydroxyl number (mg KOH/gm) of 25.6-27.6.

In certain embodiments, Part A additionally comprises a plasticizer. In some embodiments, the plasticizer may comprise dipropyl heptyl phthalate ester, diisooctyl phthalate, diisononyl phthalate, diisodecyl phthalate, and/or 1,2-cyclohexanedicarboxylic acid diisononyl ester.

Part B comprises aromatic diisocyanate monomer and an isocyanate terminated prepolymer. The prepolymer comprises the reaction product of an aromatic diisocyanate or polyisocyanate and polyol. For purposes of illustration but not by way of limitation, the polyisocyanate used in part B may have an average functionality equal to about 2.

For purposes of illustration but not by way of limitation, the aromatic diisocyanate or polyisocyanate may comprise at least one of toluene diisocyanates (TDI), methylene diphenyl diisocyanates (MDI), phenylene diisocyanate, diphenylmethane diisocyanate, polyphenylmethane polyisocyanate (Polymeric MDI), naphthalene diisocyanate, triphenylmethane triisocyanate, diphenyl sulfone diisocyanate, dimers or trimers of these diisocyanates, or mixtures thereof.

For purposes of illustration but not by way of limitation, in certain embodiments, the isocyanate may comprise at least one of toluene 2.4-diisocyanate, toluene 2,6-diisocyanate, naphthylene 1,5-diisocyanate, 4,4'-methylene diphenyl diisocyanate, 2,4'-methylene diphenyl diisocyanate, urethodione diisocyanate, hexahydrotolylene diisocyanate (and isomers), 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate, dimers or trimers of these isocyanates, or mixtures thereof. In some embodiments, the Part B aromatic diisocyanate monomer may comprise at least one of toluene diisocyanate (TDI), methylene diphenyl diisocyanate (MDI), or mixtures thereof.

For purposes of illustration but not by way of limitation, in certain embodiments, the isocyanate is toluene diisocyanate (TDI) that is an 80% -20% mixture of the 2,4 and 2,6 isomers of toluene diisocyanate, commercially available as Lupranate® T80 marketed by BASF Corporation. In certain embodiments, the isocyanate is pure 2,4 diphenylmethane diisocyanate, commercially available as Lupranate® MI commercially available from BASF Corporation. The amount of isocyanate that may be used in Part B may be about 16% to about 35%, in certain embodiments about 22% to about 28% by weight, based on the total weight of the Part B components.

For purposes of illustration but not by way of limitation, the Part B polyol component may comprise at least one diol, triol or tetrol having a nominal weight average molecular weight of between 1,000 and 6,000, and is present in an amount of from about 35% to about 60% by weight, based on the total weight of the Part B components. In certain embodiments. the theoretical % NCO content of Part B is in the range of from about 2% to about 10%, as measured by 0.1N HCl Titration using automatic titrator, as per ASTM D-2572-90 (Test method for Isocyanate Groups in Urethane Prepolymers).

In certain embodiments, the Part B polyol component may comprise at least one of a polyester polyol or a polyether polyol. In certain embodiments, the polyol comprises Pluracol® 726 or Pluracol® P1010, which are commercially available from BASF Corporation, and which are described in detail above.

The polyether polyols may be formed with an initiator, as is known in the art, and may be at least one of, but not limited to, ethylene glycol, diethylene glycol, propylene glycol, dipropylene glycol, butane diol, glycerol, trimethylolpropane, triethanolamine, pentaerythritol or sorbitol.

In certain embodiments, Part A additionally comprises at least one of any of conventional, commercially available catalyst, inorganic filler, plasticizers, colorant, antioxidant, UV light absorber, free radical initiator, adhesion promoter, calcium oxide, expandable microspheres (including Expancel® products available from AkzoNobel), drying agents, or mixtures thereof. In certain embodiments, Part A additionally comprises at least one of any of conventional, commercially available organic fillers, chain extenders, UV stabilizers, light stabilizers, fungicides, mildewcides, biocides, fire retardants, surface additives, mineral oils, dispersing agents, defoaming agents, storage stabilizers, latent hardeners, cure retarders, antifoaming agents, solvents, or mixtures thereof.

In certain embodiments, the total amount of such additives may be from about 10 to about 55 weight percent; and in certain embodiments about 30 to about 50 weight percent, based on the total weight of the Part A formulation.

By way of example, but not of limitation, the sealant and adhesive formulations may contain from 0 to about 5 percent by weight of UV absorbers, from 0 to 5 percent by weight of antioxidants, from 0 to about 2 percent by weight of mildewcides, from 0 to about 2 percent by weight of biocides, from 0 to about 2 percent by weight of fungicides, from 0 to about 20 percent by weight of fire or flame retardants, from 0 to about 10 percent by weight of pigments, from 0 to about 2 percent by weight of catalysts, from 0 to about 5 percent by weight of adhesion promoters, from 0 to about 10 percent by weight of flow and leveling additives, from 0 to about 2 percent by weight of wetting agents, from 0 to about 2 percent by weight of antifoaming agents, from 0 to about 2 percent by weight of storage stabilizers, from 0 to about 10 percent by weight of latent hardeners, from 0 to about 30 percent by weight of plasticizers, from 0 to about 5 percent by weight of dispersing agents, from 0 to about 10 percent by weight solvents, and in certain embodiments from 3 to about 10 percent by weight solvents, from about 20 to about 50 percent by weight of fillers, from 0 to about 5 percent by weight of drying agents, and/or from 0 to about 5 percent by weight of rheology modifiers.

For purposes of illustration but not by way of limitation, the plasticizer may comprise adipate, azelainate, sebacate, sulfonate, trimellitate, phosphate, fumarate, or maleate ester or diester, or mixtures thereof. For illustration purposes but not by way of limitation, the plasticizer may comprise at least one of dioctyl adipate, 2-ethylhexyl adipate, diisononyl adipate, or diisodecyl adipate, di(2-ethylhexyl)azelainate, di(2-ethylhexyl)sebacate, phenyl alkylsulfonates, tri(2-ethylhexyl)trimellitate, triphenyl phosphate, tricresyl phosphate, trixylenyl phosphate, cresyl diphenyl phosphate, xylenyl diphenyl phosphate, butyl fumarate, bis(2-methylpropyl)fumarate, diisobutyl fumarate, or bis(2-ethylhexyl)fumarate, dimethyl maleate or diethyl maleate, di-(2-propyl heptyl)phthalate, or mixtures thereof. The plasticizer may comprise Palatinol® DPHP (di-(2-propyl heptyl)phthalate ester) from BASF Corporation. The amount of plasticizer typically used may be about 0% to about 8%, in certain embodiments, about 2% to about 7% by weight, based on the total weight of the prepolymer.

In certain embodiments, adhesion promoters may also be used in the adhesive or sealant formulations. For purposes of illustration but not by way of limitation, adhesion promoters may include, but are not limited to, at least one of 2-aminoethyl-dimethylmethoxysilane, 6-aminohexyl-tributoxysilane, 3-aminopropyl-trimethoxysilane, 3-aminopropyl-triethoxysilane, 3-aminopropyl-methyldimethoxysilane, 3-aminopropyl-methyldiethoxysilane, 5-aminopentyl-trimethoxysilane, 5-aminopentyl-triethoxysilane, 3-aminopropyl-triisopropoxysilane, γ-glycidoxypropyltrimethoxysilane, γ-glycidoxypropyltriethoxysilane, γ-mercaptopropyltrimethoxysilane, γ-mercaptopropyltriethoxysilane, γ-ureidopropyltrimethoxysilane, γ-ureidopropyltriethoxysilane, 1-[3-(trimethoxysily)propyl]urea, 1-[3-(triethoxysilyl)propyl]urea, [3-(2-aminoethylamino)propyl]trimethoxysilane, [3-(2-aminoethylamino)propyl]triethoxysilane, 2-(3,4-epoxycyclohexyl)ethyltrimethoxysilane, 2-(3,4-epoxycyclohexyl)ethyltriethoxysilane, 3-(phenylamino)propyl-trimethoxysilane, 3-(phenylamino)propyl-triethoxysilane, bis[3-(trimethoxysilyl)propyl]amine, bis[3-(triethoxysilyl)propyl]amine, 3-mercaptopropyl-methyldimethoxysilane, 3-mercaptopropyl-methyldiethoxysilane, [3-(2-aminoethylamino)propyl] methyl dimethoxysilane, [3-(2-aminoethylamino)propyl] methyl diethoxysilane, 3-glycidoxypropyl methyldimethoxysilane, or 3-glycidoxypropyl-methyldiethoxysilane, or combinations thereof.

In certain embodiments, one or more storage stabilizers can be used in Part A or Part B of the adhesive or sealant formulations, including but not limited to, para toluene sulfonyl isocyanate (PTSI).

In certain embodiments, one or more conventional catalysts which accelerate the isocyanate-polyol reaction may be used. In certain embodiments, one or more conventional tertiary amine catalysts may be used. For purposes of illustration but not by way of limitation, tertiary amines may include triethylenediamine, dimethylethanolamine, triethanolamine, N-ethyl morpholine, N-methyldicyclohexylamine, N,N-dimethyl cycolhexylamine, N,N,N',N'-tetramethyl-1,3-butanediamine, ether and the like. Suitable tertiary amine catalysts may include Dabco® 33LV, available from Air Products & Chemicals, Inc., Dabco® T-12 catalyst, or mixtures thereof.

The amount of catalysts, if used, may be in certain embodiments about 0.02 to about 1 weight percent and in certain embodiments about 0.06 to about 0.4 weight percent, based on the total weight of the prepolymer.

In certain embodiments, to avoid the inclusion of water during processing, an alkaline earth metal oxide, such as calcium oxide or calcium sulfate, may be included in the formulation as a de-watering agent, i.e., drying agent, for scavenging water from the formulation. For purposes of illustration but not by way of limitation, the drying agent may comprise para toluene sulfonyl isocyanate (PTSI). The amount of drying agent typically used usually may be about 0.05% to about 3%, in certain embodiments, about 0.1% to about 1% by weight, based on the total weight of the prepolymer.

The additional components for the polyurethane reaction product may be incorporated separately or may be combined with any reaction component. The additional ingredients may be mixed by conventional means, such as in an inert, dry atmosphere. The ingredients may be mixed together all at one time (in a "one stage" process); alternatively, some ingredients and/or portions of ingredients may be mixed together in one operation (or "stage"), with other ingredients and/or portions of ingredients added in an additional stage or stages.

In certain embodiments, the viscosity of the sealant or adhesive may be in the range of about 600 Pa·s (6,000 poise) to about 4,000 Pa·s (40,000 poise) at 24° C. (72° F.), and in certain embodiments from about 600 Pa·s (6,000 poise) to about 1,500 Pa·s (15,000 poise) at 24° C. (72° F.), as measured by Brookfield viscometer.

Also provided is a method of making a two part construction sealant or adhesive comprising Part A and Part B, the method comprising: a) providing a base component Part A and an activator component Part B, wherein Part A comprises at least one of a secondary amine or an acrylate monomer, and a diol, triol and/or tetrol having a nominal weight average molecular weight of between 1.000 and 6,000: and Part B comprises aromatic diisocyanate monomer or polyisocyanate and an isocyanate terminated prepolymer of aromatic isocyanate or polyisocyanate and polyol; and b) mixing the components of base component Part A to activator component Part B at a weight ratio of 5:1 to 1.8:1 to form a polyurethane reaction product; wherein the reaction product (construction sealant) exhibits a paint adhesion of at least about 3B when tested according to ASTM D3359 and a non-sag value of about 0.0-0.1 B/S when tested according to ASTM D-2202; and at least one of a 100% modulus of less than about 830 kPa (120 psi) in the presence of a plasticizer when tested according to ASTM D412; a tensile strength of about 620 kPa (90 psi) or greater when tested according to ASTM D412; or an elongation to break of about 250% or greater when tested according to ASTM D412.

In certain embodiments, the sealants or adhesives are suitable for the adhesive bonding of substrates including, but not limited to, at least one of concrete, stone, metal, ceramic, glass, plastic, wood, asphalt, thermoplastic materials, thermoset materials, rubber, or composite materials.

Part A Base samples were combined with Part B Activator samples according to the following examples. Once the experimental NCO % is close to theoretical NCO %, the batch is allowed to cool and drying agent is added. The formulations were evaluated with respect to paintability, non-sag and viscosity properties, and tensile and elongation properties.

Performance capabilities can be expressed in terms of measured physical properties such as tensile strength (kPa/psi), elongation percentage, and tensile stress at 100% elongation, often referred to as 100% modulus. This is measured by a standard test method such as ASTM D 412 Standard Test Methods for Vulcanized Rubber and Thermoplastic Elastomers—Tension, with the polyurethane sealants demonstrating high elongations of at least 250% or greater, and low moduli of about 275-690 kPa (40-100 psi). Non-sag properties were evaluated using according to ASTM D-2202, (that is, using a Frazier (Boeing) Flow Test Jig, i.e. Boeing Slump Gage or Jig, where 0.0=no slump, 0.254=slump of 0.254 cm (0.1=slump of 0.1 inch), demonstrating a non-sag value of about 0.0-0.1 B/S. The viscosity of the sealant may be in the range of 500 Pa·s (5,000 poise) to 3,500 Pa·s (35,000 poise) at 24° C., as measured by a Brookfield viscometer. The sealant provides very good tensile properties, and may be characterized as having relatively low modulus.

In certain embodiments, a polyurethane sealant or adhesive is provided, wherein the sealant or adhesive may have a 100 percent modulus of less than about 690 kPa (100 psi). In other embodiments, the polyurethane sealant may have a 100 percent modulus of about 345 kPa (50 psi) to about 690 kPa (100 psi). In yet other embodiments, the polyurethane sealant may have a 100 percent modulus of about 410 kPa (60 psi) to about 550 kPa (80 psi).

In certain embodiments, the polyurethane sealant may have a tensile strength of about 620 kPa (90 psi) or greater. In other embodiments, the polyurethane sealant may have a tensile strength of about 690 kPa (100 psi) or greater. In yet other embodiments, the polyurethane sealant may have a tensile strength of about 830 kPa (120 psi) or greater.

In certain embodiments, the polyurethane sealant may have an elongation at break of about 250 percent or greater. In other embodiments, the polyurethane sealant may have an elongation of about 300 percent or greater. In yet other embodiments, the polyurethane sealant may have an elongation of about 350 percent or greater.

Improved performance is typically obtained for clean and dry substrate surfaces. Surface preparation before sealant application can include water-blasting, sandblasting, cleaning, and drying of concrete surfaces, cleaning of metal surfaces with organic solvents, scuff-sanding and organic solvent wiping of composite surfaces, flame-etching of plastic surfaces, and the like. When applied to a substrate, in certain embodiments, a polyurethane sealant is provided that is at least about 0.64 cm (0.25 inch) thick. In other embodiments, the polyurethane sealant is from about 0.64 cm (0.25 inch) to about 3.2 cm (1.25 inch) thick.

Paint adhesion was evaluated using a standard paint adhesion test method such as ASTM D3359 Standard Test Method for Measuring Adhesion by Tape Test. Using this crosshatch adhesion test method, a rating of 5B is given to the sample if the edges of the cuts are completely smooth and none of the squares of the lattice is detached, therefore 0% adhesion failure. A rating of 4B applies if small flakes of the coating are detached at intersections of cuts, and less than 5% of the area is affected, therefore 5% adhesion failure. A rating of 3B applies if small flakes of the coating are detached along edges and at intersections of cuts, and the adhesion failure area is 5 to 15% of the lattice. A rating of 2B applies if the coating has flaked along the edges and on parts of the squares, and the adhesion failure area is 15 to 35% of the lattice. A rating of 1B applies if the coating has flaked along the edges of cuts in large ribbons and whole squares have detached, and the adhesion failure area is 35 to 65% of the lattice. A rating of 0B applies if flaking and detachment is worse than Grade 1B, corresponding to adhesion failure area of greater than 65% of the lattice.

The subject sealant or adhesive provides excellent paintability, defined as a high level adhesion between the sealant and an applied paint that can be measured by ASTM D 3359. In certain embodiments, the polyurethane sealant reaction product is paintable such that paint adheres to the surface of the sealant with a rating of at least 3B when tested according to the paint adhesion test ASTM D3359. The paint may be a latex paint, solvent-borne paint, or solvent-free paint. Polyurethane sealants made according to the foregoing description demonstrate non-sag, high elongations, low modulus, and good paint adhesion for construction sealants.

When Parts A and B are mixed together, non-sag is created immediately as urea paste is immediately formed. Typically, when the base is mixed with the activator, the mixed product exhibits a grainy surface. The surface of the mixed product is typically difficult to process, particularly if a large amount of amine is added, such as greater than 1.2%. If smaller quantities of amine are added such as 0.1-0.5%, the product exhibits poor non-sag properties and little improvement in terms of paintability and adhesion on substrates.

It is desirable to use from about 0.6 weight percent to about 0.8 weight percent of secondary amines such as piperazine, or from about 3 weight percent to about 4 weight percent of acrylate monomers, based on the weight of Part A and Part B in the formulation, in order to achieve paintability and good adhesion on various substrates. It has been found that depending on the type and amount of isocyanate blended into Part B, such as pure MDI or Lupranate® MI isocyanates, having a functionality of about 2, in the amount of from about 1% to about 4%, the surface condition of the mixed product may be improved, i.e., a less grainy, slightly textured or smooth surface can be achieved, while at the same time the resulting product exhibits paintability and good non-sag. Piperazine, a secondary amine, exhibits slower reactivity than a primary amine, and when added into the Base, it results in longer open time and an easy to form urea paste.

It was not previously known to enhance the paint adhesion of two component polyurethane systems by controlling the levels of aromatic isocyanate such as MDI in order to obtain very good paint adhesion. The addition of monomeric diisocyanate to the isocyanate terminated prepolymer (Activator) introduces more polar groups for hydrogen bonding and results in a less grainy, smoother surface after mixing Parts A and B, as it prevents too much of the secondary amine, such as piperazine, from reacting with the isocyanate terminated prepolymer. It was found that Lupranate® MI (MDI) performed well, as Lupranate® MI reacted with the secondary amine and formed a linear structure of urea paste which improved sag resistance and is good for paintability. Thus, modification of the Activator (Part B) to provide more linear structure by adding monomeric diisocyanate to the isocyanate terminated prepolymer results in a less grainy surface of mixed sealants.

Addition of short chain diols (i.e., Pluracol® P1010 having a molecular weight of 1,000), triols (i.e., Pluracol® 726 having a molecular weight of 3,000), and tetrols (i.e., Multranol® 9168, having a molecular weight of 3,740) was found to improve the paintability of the sealant. The paintability of sealants is further improved by introducing polar groups. i.e., formation of urea paste from the reaction of piperazine and isocyanates, and/or the introduction of an acrylate network into the sealants such as by low speed vacuum mixing, which also improves sealant sag resistance (acrylate thickening).

It was not previously known to improve non-sag, easy mixability and paintability of two component polyurethane sealant and adhesive systems by modification of polyol structure, addition of aromatic diisocyanate monomer into the activator Part B, and introduction of polar groups such as acrylate and urea paste formed insitu.

Test Methods:

Paintability was measured according to ASTM D3359 Standard Test Methods for Measuring Adhesion by Tape Test.

ASTM D412 Standard Test Methods for Vulcanized Rubber and Thermoplastic Elastomers—Tension Non-sag test method: ASTM D-2202.

The following specific examples are provided to illustrate, but not limit, the preparation of the adhesive and sealant formulations as discussed above. Examples were prepared using various combinations of the following components:

Pluracol® 220, Pluracol® P1010, Pluracol® 726: polyols (BASF Corp., Wyandotte, Mich.).

Multranol® 9168 polyether polyol (Bayer Material Science, Pittsburgh, Pa.).

Piperazine diethylenediamine secondary amine (BASF SE, Germany).

Palatinol® DPHP decyl phthalate plasticizer (BASF Corporation, Houston, Tex.).

Hexamoll® DINCH 1,2-cyclohexanedicarboxylic acid, diisononyl ester (BASF SE, Germany)

Ultra-Pflex® precipitated calcium carbonate (Specialty Minerals, Inc., Bethlehem, Pa.).

Supercoat® surface modified calcium carbonate (Imerys Pigments, Roswell, Ga.).

Lowinox® 44B25 antioxidant (Chemtura Corp., Middlebury, Conn.).

Tinuvin® 328 benzotriazole light stabilizer (BASF Corporation, Florham Park, N.J.).

Tinuvin® XT850 light stabilizers (BASF Corporation, Florham Park, N.J.).

TMPTMA (Trimethylolpropane trimethacrylate) (Sartomer Company, Inc., Exton, Pa.).

Aerosil® 200 fumed silica (Evonik Industries).

Vazo® 52 free radical initiator (Dupont; Wilmington, Del.).

Silquest A-187®, Silquest A-1100® adhesion promoters (Crompton Corp., Middlebury, Conn.).

Dabco® 33LV tertiary amine catalyst (Air Products and Chemicals, Inc.) and Dabco® T-12 catalyst (dibutyltindilaurate, DBTDL) (Air Products & Chemicals, Inc., Allentown, Pa.).

Lupranate® MI isocyanate (pure diphenylmethane diisocyanate); Lupranate® T-80 toluene diisocyanate (TDI) (80%-20% mixture of the 2,4 and 2,6 isomers of toluene diisocyanate);

Lupranate® M10 polymeric methylene diphenyl diisocyanate; (BASF Corporation, Wyandotte, Mich.).

1,4-Butanediol (BASF Corporation, Geismar, La.)

m-Cresol (Sigma-Aldrich., St. Louis, Mo.)

TiO2—titanium dioxide (DuPont, Wilmington, Del.).

BzCl (Benzoyl Chloride): (Sigma-Aldrich Corp., St. Louis, Mo.).

PTSI (p-Toluenesulfonyl Isocyanate) storage stabilizer (VanDeMark Chemical, Inc., Lockport, N.Y.).

Expancel® 551DE microspheres (AkzoNobel, Duluth, Ga.).

2,5-Xylenol 2,5-dimethylphenol (Sichuan Hongguang and Taizhou Hiday, China).

BYK W-966/W-980 wetting and dispersing additives (BYK Chemie, Germany).

A100®: Acrylic latex primer (Sherwin-Williams, Inc., Cleveland, Ohio).

Colorflex™ acrylic elastomeric coating (BASF Corporation, Shakopee, Minn.).

Thoro® 20 acrylic copolymer waterproofing sealer (BASF Corporation, Shakopee, Minn.).

Thoro® 35 waterborne high-build acrylic copolymer waterproofing sealer (BASF Corporation, Shakopee, Minn.).

Z6106® Silane (Glycidoxypropyl trimethoxysilane) (Dow Corning, Midland Mich.).

For some formulations, intermediate prepolymers and/or silane adducts were prepared as follows.

| Preparation Of Intermediate 1 | | |
|---|---|---|
| | Intermediate 1 Components | Wt. % |
| 1 | Lupranate ® M10 | 32.46 |
| 2 | Hexamoll ® DINCH | 43.14 |
| 3 | m-Cresol | 24.35 |
| 4 | Dabco ® 33LV, 50% in Palatinol ® DINCH | 0.05 |
| | Total Weight | 100.00 |
| | NCO % Final | 0.87 |

Synthesis Procedure for Intermediate 1:

Lupranate® M10 and DINCH were added, mixed, and nitrogen purged. Then m-Cresol and Dabco® 33LV (50%) were added, mixed, and heated to 85° C. to react for 2-5 hours. The mixture was then packaged.

| Preparation Of Intermediates 2 and 3: | | | |
|---|---|---|---|
| | Components | Intermediate 2 Wt % | Intermediate 3 Wt % |
| 1 | 2,5-Xylenol | 26.84 | 22.24 |
| 2 | Palatinol ® DPHP | 42.00 | 51.98 |
| 3 | Lupranate ® M10 | 31.10 | 25.54 |
| 4 | Dabco ® 33LV, 50% in Palatinol ® DPHP | 0.030 | 0.04 |
| 5 | Dabco ® 33LV, 50% in Palatinol ® DPHP | 0.030 | 0.04 |
| 6 | PTSI | 0.0 | 0.17 |
| | Total Weight | 100.000 | 100.00 |
| | NCO % Final | 0.82 | 0.52 |

Synthesis Procedure for Intermediate 2 and 3:

Xylenol and DPHP were added, mixed, and nitrogen purged. Lupranate® M10 and Dabco® 33LV (50%) were added, mixed, heated to 85° C. to react for 2-5 hours, and cooled down. PTSI was added if necessary, mixed, and the mixture packaged.

TABLE 1

| Silane Adduct Formulation | |
|---|---|
| Component | Wt. % |
| Lupranate ® T80 | 26.13 |
| Palatinol ® DPHP | 50.42 |
| Silquest A-1100 ® Silane | 23.45 |
| Total Weight | 100.00 |
| NCO/NH Ratio | 1.41 |
| NCO % Final | 3.70 |

Synthesis Procedure for Silane Adduct:

Lupranate® T80 and DPHP were added, mixed, and nitrogen purged. Silane was added slowly, mixed, and heated, reacted for 2-5 hours, and cooled down, and the mixture packaged.

The exemplified Part A Base formulations are listed in Tables 2A and 2B.

TABLE 2A

Base Formulations (Part A)

| Component | Sealant Base Type |  |  |  |  |  |
|---|---|---|---|---|---|---|
| | Urea | Urea | Acrylate | Acrylate Base | Acrylate Kit Mix #1 | Acrylate Kit Mix #2 |
| | 1 Wt. % | 2 Wt. % | 3 Wt. % | 4 Wt. % | 5 Wt. % | 6 Wt. % |
| Pluracol ® 220 | 26.81 | — | 29.75 | — | 28.1 | 28.1 |
| Pluracol ® P-726 | — | 32.5 | — | 35.8 | 8.8 | 8.8 |
| Multranol ® 9168 | 5.36 | — | 11.79 | — | 2.75 | 2.75 |
| Palatinol ® DPHP | 11.01 | 11.1 | 6 | 9.1 | 8 | 8.46 |
| Piperazine | 1.6 | 1.7 | — | — | — | — |
| Tinuvin ® 328 | 0.32 | 0.34 | 0.33 | 0.33 | 0.35 | 0.35 |
| Tinuvin ® XT850 | 0.55 | — | — | — | — | — |
| Lowinox ® 44B25 | 0.32 | 0.34 | 0.33 | 0.33 | 0.35 | 0.35 |
| $TiO_2$, Dried | 3.83 | 4.08 | 3.89 | 3.89 | — | 4 |
| Ultra-Pflex ®, Dried | 19.4 | 20.67 | 19.3 | 20.5 | 22.83 | 22.83 |
| Supercoat ®, Dried | 30.25 | 25.31 | 22.83 | 23.91 | 20.28 | 20.26 |
| Aerosil ® 200 | — | — | 0.85 | 0.85 | — | — |
| A-187 | 0.51 | 0.54 | 0.52 | 0.52 | — | — |
| TMPTMA | — | — | 4.3 | 4.65 | 4.5 | 4.05 |
| Vazo ® 52 | — | — | 0.047 | 0.049 | 0.046 | 0.041 |
| T-12 Catalyst | 0.049 | 0.07 | 0.07 | 0.08 | 0.02 | 0.02 |
| Total Weight | 100.00 | 100.00 | 100.00 | 100.00 | 100.02 | 100.00 |

TABLE 2B

Base Formulations (Part A)

| Component | Sealant Base Type |  |  |  |
|---|---|---|---|---|
| | Urea | Urea Base | Urea | Urea |
| | 7 Wt. % | 8 Wt. % | 9 Wt. % | 10 Wt. % |
| Pluracol ® 220 | 25.87 | 30.1 | 26.24 | 25.55 |
| Pluracol ® P-726 | 3.4 | 3.46 | 3.44 | 3.44 |
| Multranol ® 9168 | 1.6 | 1.67 | 1.85 | 1.66 |
| Palatinol ® DPHP | 17.74 | 16.38 | 14.29 | 14.17 |
| Piperazine | 1.23 | 1.27 | 1.1 | 1.09 |
| Tinuvin ® 328 | 0.35 | 0.35 | 0.36 | 0.35 |
| Lowinox ® 44B25 | 0.35 | 0.35 | 0.36 | 0.35 |
| $TiO_2$, Dried | 4 | 4 | 4.05 | — |
| Ultra-Pflex ®, Dried | 24.97 | 24.97 | 27.27 | 28.91 |
| Supercoat ®, Dried | 20.47 | 17.45 | 20 | 21.1 |
| T-12 Catalyst | 0.015 | 0.015 | 0.07 | 0.05 |
| BYK W-980 | — | — | — | 1.09 |
| BYK W-966 | — | — | 0.99 | — |
| Expancel ® 551DE | — | — | 2.2 | 2.24 |
| Total Weight | 100.00 | 100.00 | 100.00 | 100.00 |

Part A Base samples were prepared according to the following procedures:

Synthesis Procedure for Urea containing Bases 1 and 2:
Polyols, DPHP, piperazine, antioxidant, UV absorbers, and TiO2 were added, mixed to wet out, Ultra-Pflex® and Supercoat® were added, heated to 85° C., mixed, and cooled to 43° C. Silane and catalyst were added and mixed well, and the mixture packaged.

Synthesis Procedure for acrylate containing Bases 3 through 6:
Polyols, DPHP, antioxidant, UV absorbers, fumed silica (if necessary), and TiO2 were added, mixed to wet out, Ultra-Pflex® and Supercoat® were added and mixed. TMPTMA was added, mixed, Vazo®-52 was added, heated to 77° C., vacuum mixed, and cooled to 43° C. Silane (if necessary) and catalyst were added and mixed well, and the mixture packaged.

Synthesis Procedure For urea containing Bases 7 through 10:
Polyols, DPHP, antioxidant, UV absorbers, and $TiO_2$ were added, mixed to wet out, Ultra-Pflex® and Supercoat® were added, heated to 85° C., mixed, and cooled to 43° C. The Piperazine/DPHP premix for Bases 7 through 10 was prepared in a glass container. Piperazine/DPHP premix was added, mixed, the BYK additive and Expancel (used in Bases 9 and 10) were added and mixed, catalyst was added and mixed well, and the mixture packaged.

TABLE 3

Activator Formulations (Part B)

| Activator Formulation | 1 | 2 | 3 | 4 | 5 | 6 | 7 | 8 |
|---|---|---|---|---|---|---|---|---|
| Pluracol ® 726, % | 70.78 | 60 | 26.05 | 48 | 33.79 | 17.83 | 16.87 | 16.17 |
| Pluracol ® P1010, % | — | 18.56 | 49.45 | 28.85 | 42 | 33.84 | 32.03 | 30.7 |
| 1,4-Butanediol, % | 3.33 | — | — | — | — | — | — | — |

TABLE 3-continued

| Activator Formulation | 1 | 2 | 3 | 4 | 5 | 6 | 7 | 8 |
|---|---|---|---|---|---|---|---|---|
| Activator Formulations (Part B) | | | | | | | | |
| Lupranate ® T80, % | 25.21 | 21.1 | 21.18 | 19.51 | 20.52 | 14.49 | 13.72 | 13.15 |
| Lupranate ® MI, % | — | — | 3.28 | 3.35 | 3.35 | 2.25 | 6.8 | 6.54 |
| BzCl (1% solution in Pluracol ® 726), % | 0.53 | — | — | — | — | — | — | — |
| BzCl (2% solution in Pluracol ® 726), % | — | 0.19 | 0.19 | 0.19 | 0.19 | 0.12 | 0.12 | 0.11 |
| Dabco ® 33LV (50% solution in Pluracol ® 726), % | 0.15 | 0.15 | 0.15 | 0.15 | 0.15 | 0.09 | 0.07 | 0.07 |
| PTSI, % | 0.27 | 0.25 | 0.25 | 0.25 | 0.25 | 0.16 | 0.16 | 0.15 |
| Silane Adduct, % | — | — | — | — | — | 10.98 | 10.68 | 10.29 |
| Intermediate 1, % | — | — | — | — | — | 20.24 | — | — |
| Intermediate 3, % | — | — | — | — | — | — | 19.56 | 22.83 |
| Total | 100.34 | 100.25 | 100.55 | 100.3 | 100.25 | 100.00 | 100.00 | 100.00 |
| % NCO | 5.98 | 6.01 | 5.96 | 6.01 | 4.8 | 4.81 | 6.07 | 5.79 |
| NCO/OH ratio | 1.97 | 2.44 | 2.14 | 2.33 | 1.93 | 1.88 | 2.77 | 2.76 |

Synthesis Procedure For Activator (prepolymer) 1 through 5:

Polyols and BzCl were added, mixed, and heated. Lupranate® T80 and Dabco® 33LV were added, reacted for 2-5 hours, and cooled down. Lupranate® MI if necessary and PTSI were added, mixed, and packaged.

Synthesis Procedure For Activator (prepolymer) 6 through 8:

Pluracol ® 726, Pluracol® P1010, and BzCl were added, mixed, and heated. Lupranate® T80 and Dabco® 33LV were added, reacted for 2-5 hours, and cooled down. Lupranate® MI, PTSI, silane adduct, and Intermediate were added, mixed, and packaged.

TABLE 4

Two Part Sealants, Urea and Acrylate Containing Bases

| | Sealant Base Type | | | | | |
|---|---|---|---|---|---|---|
| | Urea | Urea | Urea | Urea | Acrylate | Acrylate |
| Example No. | 1 | 2 | 3 | 4 | 5 | 6 |
| Pluracol ® 220, % | — | 28.08 | 21.89 | 21 | — | 21.06 |
| Pluracol ® P1010, % | 11.17 | — | — | — | — | — |
| Pluracol ® 726, % | 4.6 | — | 22.04 | — | — | — |
| Multranol ® 9168, % | — | 5.72 | — | 4.2 | 10.32 | 8.68 |
| Piperazine, % | 0.76 | 1.12 | 1.24 | 1.25 | — | — |
| Palatinol ® DPHP, % | 6.34 | — | 8.22 | 8.92 | 5.14 | 5.34 |
| TiO$_2$, % | 1.97 | 2.81 | 2.98 | 3 | 3.08 | 3.2 |
| Ultra-Pflex ®, % | 15.91 | — | 15.09 | 15.2 | 14.93 | 15.53 |
| Supercoat ®, % | 22.66 | 27.44 | 22.14 | 23.4 | 21.09 | 21.93 |
| Lowinox ® 44B25, % | 0.22 | 0.23 | 0.25 | 0.25 | 0.26 | 0.27 |
| Tinuvin ® 328, % | 0.16 | 0.23 | 0.25 | 0.25 | 0.26 | 0.27 |
| TMPTMA, % | — | — | — | — | 3.32 | 3.45 |
| Aerosil ® 200 | 0.39 | 0.56 | — | — | 0.63 | 0.66 |
| Vazo ® 52, % | — | — | — | — | 0.036 | 0.038 |
| A-187, % | 0.27 | 0.37 | 0.4 | 0.4 | 0.41 | 0.43 |
| Dabco ® 33LV, % | 0.09 | — | — | — | — | — |
| T-12, % | 0.09 | 0.02 | 0.04 | 0.04 | 0.06 | 0.07 |
| Lupranate ® MI, % | — | — | 2.44 | 2.46 | 0.71 | 0.65 |
| Activator | 2 | 1 | 2 | 3 | 2 | 2 |
| Activator, % | 35.03 | 33.41 | 24.51 | 20.41 | 18.29 | 17.19 |
| NCO/(OH + NH) ratio | 1.4 | 1.05 | 1.5 | 1.68 | 1.5 | 1.5 |
| Non-Sag, B/S | 0.09 | 0.03 | 0.07 | 0.03 | 0.05 | 0.03 |
| Viscosity, poise | 5,320 | 7,340 | 15,840 | >40,000 | 12,760 | 13,260 |
| Viscosity, Pa · s | 532 | 734 | 1,584 | >4,000 | 1,276 | 1,326 |
| Surface | grainy | grainy | some texture, not grainy | less texture, not grainy | smooth | smooth |
| Paint Adhesion, A-100 ® | 4.5B | 2.5B | 5B | 4.2B | 4.7B | 5B |
| Tensile Strength, psi | 127 | 228 | 162 | 132 | 121 | 105 |
| Tensile Strength, kPa | 875 | 1570 | 1120 | 910 | 834 | 724 |
| 100% Modulus, psi | 68.3 | 86.5 | 85.9 | 58 | 65.3 | 60.2 |
| 100% Modulus, kPa | 471 | 596 | 592 | 400 | 450 | 415 |

TABLE 4-continued

Two Part Sealants, Urea and Acrylate Containing Bases

| | Sealant Base Type | | | | | |
|---|---|---|---|---|---|---|
| | Urea | Urea | Urea | Urea | Acrylate | Acrylate |
| | | | Example No. | | | |
| | 1 | 2 | 3 | 4 | 5 | 6 |
| Elongation, % | 275 | 406 | 232 | 329 | 435 | 420 |
| Hardness Shore A | 22.6 | 30.3 | 27.1 | 23.4 | 24.8 | 26 |

In Examples 1-4, shown in Table 4, good sag resistance was achieved by the addition of piperazine, although the surface began to exhibit a grainy texture as the amount of piperazine was increased. With the addition of pure diphenylmethane diisocyanate (Lupranate® MI), surface texture decreased and grainy features disappeared. Paintability of these Examples by A-100® acrylic latex primer was good to excellent. Also as shown in Table 4, Examples 5 and 6, to which acrylate monomer was added, achieved good sag resistance, a smooth sealant surface, excellent paintability by A-100® primer, and excellent tensile properties.

Tables 5 shows formulations of urea and acrylate base systems and compares their paintability for the following paints: A-100® Latex, Colorflex™, PVA Primer (grey), Thoro® 20 (brown) and Thoro® 35.

TABLE 5

Two Part Sealants Paintability

| | Sealant Base Type | | | | | | |
|---|---|---|---|---|---|---|---|
| | Urea | Urea | Urea | Acrylate | Acrylate | Acrylate | Acrylate |
| | | | | Example No. | | | |
| | 7 | 8 | 9 | 10 | 11 | 12 | 13 |
| Polyol | P-220 | P-726 | P-726 | P-220 | P-220 | P-726 | P-726 |
| Base | 1 | 2 | 2 | 3 | 3 | 4 | 4 |
| Base, % | 77.40 | 71.07 | 71.61 | 80.31 | 77.9 | 74.52 | 72.14 |
| Lupranate ® | MI | MI | T80 | MI | — | MI | MI |
| Lupranate ®, % | 2.43 | 2.46 | 1.72 | 0.67 | — | 0.85 | 0.67 |
| Activator | 5 | 5 | 5 | 4 | 5 | 4 | 5 |
| Activator, % | 20.17 | 26.47 | 26.67 | 19.02 | 22.1 | 24.63 | 27.19 |
| A-100 ® | 5B | 5B | 4B | 5B | 5B | 5B | 5B |
| Colorflex ™ | 4B | 5B | 5B | 4B | 5B | 5B | 5B |
| PVA primer | 5B | 5B | 58 | 4B | 4B | 5B | 5B |
| Thoro ® 20 | 4B | 5B | 5B | 0B | 1B | 0B | 3B |
| Thoro ® 35 | 4B | 4B | 5B | 3B | 5B | 4B | 5B |
| Total | 100.00 | 100.00 | 100.00 | 100.00 | 100.00 | 100.00 | 100.00 |
| Non-Sag, B/S | 0.16 | 0.03 | 0.06 | 0.02 | 0.03 | 0.28 | 0.28 |
| Surface | smooth | some texture | smooth | smooth | smooth | smooth | smooth |

Test results shown in Table 5 illustrated excellent paintability for urea- and acrylate-containing sealant systems, and fair paintability toward Thoro® 20 sealer by the acrylate containing sealants. Thoro® 20 sealer is a difficult paint for sealants, as is seen in Table 6. The results in Table 5 also show that a smooth sealant surface could be achieved for the urea-containing sealant system.

Table 6 below compares the paintability of the present two part construction sealant as compared to sealants of Competitors 1 and 2. The exemplified subject sealants exhibited much better paintability than those of the competitors.

TABLE 6

Paintability Comparison

| Paint | Urea | Acrylate | Competitor 1 | Competitor 2 |
|---|---|---|---|---|
| A-100 ® Latex | 5B | 5B | 0.2B | 1B |
| Colorflex ™ | 5B | 5B | 3.4B | 0B |
| PVA Primer | 5B | 5B | 3.1B | 3.5B |
| Thoro ® 20 | 5B | 2-3B | 0.3B | 0B |
| Thoro ® 35 | 4B | 5B | 1.2B | 0B |

KEY:
0B: >65% failure
1B: 35-65% failure

TABLE 6-continued

Paintability Comparison

| Paint | Urea | Acrylate | Competitor 1 | Competitor 2 |
|---|---|---|---|---|

2B: 15-35% failure
3B: 5-15% failure
4B: <5% failure
5B: 0% failure

TABLE 7

Acrylate Kit Mix

| | System | |
|---|---|---|
| | Acrylate Kit Mix #1 | Acrylate Kit Mix #2 |
| Base | 5 | 6 |
| Activator | 6 | 6 |
| Mix Ratio by Wt. of Base:Activator | 3.55:1 | 3.55:1 |
| A-100 ®, Colorflex ™, PVA Primer & Thoro ® 35 | all 5B | all 5B |
| Thoro ® 20 | 3B | 2.5B |
| NCO/OH ratio | 1.17 | 1.24 |
| Non-Sag, B/S | 0.0 | 0.0 |

Table 7 demonstrates the test results of a two part sealant utilizing two acrylate kit mixes in the Base Formulations. A kit mix is used in the method used by construction contractors to use and apply sealants in the field. A kit mix typically comprises a two gallon pail containing base, activator, and a color pack. Contractors mix the three parts together, and apply it on the construction joints to be sealed. The use of a kit mix enables testing of actual processing performance (such as ease of mixing and application, pot life, surface smoothness and sag resistance) of sealants, as if on a job in the field. The kit mixes demonstrated very good performance such as sag resistance and paintability.

The ethylenediamine (EDA) derived sealant formulations of the examples in Table 8, and the piperazine derived sealant formulations of the examples in Table 9 were prepared by mixing the identified components in the amounts listed therein.

NCO:(OH+NH) Ratio

In certain embodiments, the amount of base component Part A and activator component Part B used is sufficient to provide a ratio of isocyanate equivalents to the sum of polyol and amine equivalents of about 0.9:1 to about 1.7:1. In other embodiments, the NCO/(OH+NH) ratio is about 0.9:1 to about 1.4:1. In still other embodiments, the NCO/(OH+NH) ratio is about 1:1 to about 1.35:1. In some embodiments, the NCO/(OH+NH) ratio ranges from about 1.05:1 to about 1.25:1.

In certain embodiments, the components of Part A to Part B may be provided to be mixed at a weight ratio of about 5:1 to about 1.8:1. In some embodiments, the components of Part A to Part B may be provided to be mixed at a weight ratio of about 4.8:1 to about 2:1, in other embodiments at a weight ratio of about 4.5:1 to about 2.5:1.

TABLE 8

Ethylenediamine (EDA) Derived Sealant Formulations
Effect Of NCO:(OH + NH) Ratio And Various Amounts Of EDA

| | Example No. | | | | | |
|---|---|---|---|---|---|---|
| Component | 14 Wt. % | 15 Wt. % | 16 Wt. % | 17 Wt. % | 18 Wt. % | 19 Wt. % |
| Pluracol ® 220 | 25.6 | 24.9 | 26.55 | 25.9 | 25.9 | 25.9 |
| Pluracol ® 726 | 2.5 | 3 | 3 | 3.4 | 2.75 | 3.4 |
| Multranol ® 9168 | 2.7 | 2.9 | 1.35 | 1.6 | 2.25 | 1.5 |
| Palatinol ® DPHP | 13.7 | 13.96 | 17.11 | 16.26 | 15.8 | 16.7 |
| EDA | 1.03 | 1.06 | 0.92 | 1.07 | 0.93 | 0.93 |
| Tinuvin ® 328 | 0.35 | 0.35 | 0.35 | 0.35 | 0.35 | 0.35 |
| Lowinox ® 44B25 | 0.35 | 0.35 | 0.35 | 0.35 | 0.35 | 0.35 |
| $TiO_2$, Dried | 4 | 4 | 4 | 4 | 4 | 4 |
| Ultra-Pflex ®, Dried | 28.5 | 28.24 | 26 | 26.4 | 26.4 | 25.5 |
| Supercoat ®, Dried | 21.25 | 21.22 | 20.35 | 20.76 | 21.25 | 21.26 |
| T-12 | 0.008 | 0.014 | 0.016 | 0.024 | 0.018 | 0.024 |
| Silane Adduct | 3.33 | 3.35 | 3.28 | 3.31 | 3.31 | 3.31 |
| Intermediate 2 | 6.2 | 6.25 | 6.09 | 6.15 | 6.15 | 6.15 |
| Lupranate ® MI | 1.41 | 1.46 | 1.59 | 1.97 | 1.74 | 1.82 |
| Activator 3 | 24.76 | 26.54 | 22.98 | 24.72 | 24.32 | 24.2 |
| Total Weight | 135.7 | 137.53 | 133.94 | 136.25 | 135.542 | 135.48 |
| NCO/(OH + NH) | 0.98 | 1.01 | 1.04 | 1.04 | 1.09 | 1.10 |
| Non Sag, B/S | 0.02 | 0.03 | 0.15 | 0.1 | 0.01 | 0.1 |
| Viscosity, poise | 63,700 | 48,300 | 19,800 | 38,300 | 30,900 | 51,100 |
| Viscosity, Pa · s | 6.370 | 4,830 | 1,980 | 3,830 | 3,090 | 5,110 |
| Tensile Strength, psi | 178 | 346 | 371 | 369 | 338 | 332 |
| Tensile Strength, kPa | 1,230 | 2,390 | 2.560 | 2.540 | 2,330 | 2.290 |
| 100% Modulus, psi | 74.4 | 103.4 | 99.8 | 100.4 | 90.4 | 92.7 |
| 100% Modulus, kPa | 513 | 712.9 | 688 | 692.2 | 623 | 639 |
| Elongation, % | 404 | 600 | 658 | 624 | 639 | 602 |
| Hardness, Shore A | 25.3 | 30.3 | 31.9 | 30.3 | 28.8 | 29.4 |

In the Examples reported in Table 8, ethylenediamine (EDA) was used to replace piperazine in the formulation of the base components. Results using various amounts of EDA, and NCO/(OH+NH) ratio were tested and are reported. The resulting sealants exhibited good sag resistance and excellent elongation. However, it was observed that piperazine may provide better performance than ethylenediamine.

TABLE 9

Effect Of Various NCO:(OH + NH) Ratios On Properties Of Sealants

| | Example No. | | | | | |
|---|---|---|---|---|---|---|
| | 20 | 21 | 22 | 23 | 24 | 25 |
| Sealant Base Type | Urea | Urea | Urea | Urea | Urea | Urea |
| Base | 7 | 7 | 7 | 8 | 8 | 8 |
| Pluracol ® 220, % | 19.94 | 19.65 | 19.08 | 22.52 | 22.11 | 21.56 |
| Pluracol ® 726, % | 2.62 | 2.58 | 2.5 | 2.59 | 2.54 | 2.48 |
| Multranol ® 9168 % | 1.23 | 1.21 | 1.18 | 1.25 | 1.23 | 1.2 |
| Piperazine, % | 0.95 | 0.94 | 0.91 | 0.95 | 0.93 | 0.91 |
| Palatinol ® DPHP % | 13.67 | 13.47 | 13.08 | 12.25 | 12.03 | 11.73 |
| $TiO_2$ | 3.08 | 3.03 | 2.95 | 2.99 | 2.94 | 2.86 |
| Ultra-Pflex ®, % | 19.25 | 18.96 | 18.41 | 18.68 | 18.35 | 17.89 |
| Supercoat ®, % | 15.78 | 15.55 | 15.1 | 13.05 | 12.82 | 12.5 |
| Lowinox ® 44B25 % | 0.27 | 0.27 | 0.26 | 0.26 | 0.26 | 0.25 |
| Tinuvin ® 328, % | 0.27 | 0.27 | 0.26 | 0.26 | 0.26 | 0.25 |
| T-12, % | 0.015 | 0.015 | 0.015 | 0.015 | 0.015 | 0.015 |
| Activator | 7 | 7 | 7 | 7 | 7 | 7 |
| Activator, % | 22.92 | 24.07 | 26.27 | 25.20 | 26.54 | 28.36 |
| Total | 100.00 | 100.00 | 100.00 | 100.00 | 100.01 | 100.00 |
| NCO/(OH + NH) ratio | 0.91 | 0.97 | 1.09 | 0.97 | 1.04 | 1.14 |
| Non-Sag, B/S | 0.05 | 0.03 | 0.07 | 0.03 | 0.02 | 0.03 |
| Viscosity, poise | 12,500 | 12,600 | 9,760 | 16,200 | 22,100 | 15,400 |
| Viscosity, Pa·s | 1,250 | 1,260 | 976 | 1,620 | 2,210 | 1,540 |
| Tensile Strength, psi | 140 | 179 | 241 | 78.6 | 115 | 164 |
| Tensile Strength, kPa | 965 | 1,230 | 1,660 | 542 | 793 | 1,130 |
| 100% Modulus, psi | 38.3 | 48.8 | 56.8 | 29 | 37.5 | 49.2 |
| 100% Modulus, kPa | 264 | 336 | 392 | 200 | 259 | 339 |
| Pot Life, hrs. | 4 | 4 | 4 | 3.5 | 3 | 3 |
| Surface | OK | OK | OK | Sticky | OK | OK |
| Elongation, % | 503 | 533 | 642 | 358 | 427 | 480 |
| Hardness | 20 | 20.8 | 23.8 | >15 | 19.3 | 21.7 |

The effect of a slight off-mix ratio for NCO/(OH+NH) was tested to determine whether the subject two part sealant might suffer adverse performance results during processing on the job, in the field. Test results for two batches of urea based sealants, containing Base Formulations 7 and 8, are reported in Table 9. Test results indicate that the performance remained good even with a mix ratio difference ±10%.

TABLE 10

Effect of Various Additives

| | Example No. | | | | |
|---|---|---|---|---|---|
| | 26 | 27 | 28 | 29 | 30 |
| Base | 10 | 9 | 9 | 7 | 7 |
| Activator | 8 | 8 | 3 | 3 | 8 |
| NCO/(OH + NH) ratio | 1.28 | 1.28 | 1.18 | 1.14 | 1.28 |
| Expancel ®, volume % | 34 | 34 | 34 | 34 | 34 |
| BYK additive, % | W-966 | W-980 | W-980 | — | — |
| Z6106 ® silane, % | — | — | 1.31 | 1.35 | — |
| Silane adduct, % | 2.89 | 2.91 | — | — | 3.04 |
| Color Pack, % | 6.16 | 6.1 | 6.1 | — | — |
| A-100 | 4.3B | 5B | 5B | 4.2B | 3.2B |
| Colorflex | 5B | 5B | 5B | 4B | 5B |
| PVA Primer | 3B | 5B | 5B | 5B | 5B |
| Thoro 20 | 5B | 5B | 5B | 5B | 5B |
| Thoro 35 | 1.3B | 3.2B | 5B | 5B | 5B |
| Tensile Strength, psi | 189 | 125 | 72.9 | 152 | 130 |
| Tensile Strength, kPa | 1,300 | 862 | 503 | 1,050 | 896 |
| 100% Modulus, psi | 93.7 | 63.7 | 34 | 77.5 | 72.1 |
| 100% Modulus, kPa | 646 | 439 | 230 | 534 | 497 |
| Elongation, % | 266 | 281 | 429 | 280 | 233 |
| Hardness, Shore A | 27.1 | 20.8 | 18 | 24 | 22.3 |

Expancel® microspheres were blended into the base component, and Color Pack, a mixture of high molecular weight polyether polyols and pigments which give sealants various colors, was added also. Various adhesion promoters (silane adduct or Z-6106® silane) and BYK® (W-966 or W-980) wetting and dispersing additives were also added. The resulting sealants were tested for paintability and tensile properties, which remained very acceptable as reported in Table 10.

It will be understood that the embodiment(s) described herein is/are merely exemplary. Further, all embodiments disclosed are not necessarily in the alternative, as various embodiments may be combined to provide the desired result.

We claim:

1. A two part construction sealant or adhesive comprising a base component Part A and an activator component Part B; wherein Part A comprises:
 at least one acrylate monomer; wherein the acrylate comprises at least one of trimethylol propane triacrylate, triacrylate, mixtures of triacrylate and diacrylate, or mixtures thereof, and
 a diol, triol and/or tetrol having a nominal weight average molecular weight of between 1,000 and 6,000;

Part B comprises:
 an aromatic diisocyanate monomer or polyisocyanate, and
 an isocyanate terminated prepolymer of aromatic diisocyanate or polyisocyanate and polyol;

the components of Part A to Part B provided to be mixed at a weight ratio of 5:1 to 1.8:1;

wherein the construction sealant or adhesive exhibits a paint adhesion of at least about 3B when tested according to ASTM D3359; and a non-sag value of about 0.0-0.1 B/S when tested according to ASTM D-2202;

and at least one of: a 100% modulus of less than about 690 kPa (100 psi) in the presence of a plasticizer when tested according to ASTM D412; a tensile strength of about 690 kPa (100 psi) or greater when tested according to ASTM D412; or an elongation to break of about 250% or greater when tested according to ASTM D412.

2. The sealant or adhesive according to claim 1, wherein the diol, triol or tetrol has a nominal weight average molecular weight of between 3,000 and 6,000.

3. The sealant or adhesive according to claim 1, wherein Part A comprises at least one additional diol, triol or tetrol having a nominal weight average molecular weight of between 1,000 and 6,000.

4. The sealant or adhesive according to claim 3, wherein the diol or triol or tetrol having a nominal weight average molecular weight of between 1,000 and 6,000 comprises at least one of polyether polyol, propoxylated ethylenediamine polyol, polypropylene glycol, propylene oxide adduct of glycerine, or amine-based polyether polyol.

5. The sealant or adhesive according to claim 1, wherein the diol, triol or tetrol having a nominal weight average molecular weight of between 1,000 and 6,000 comprises at least one primary hydroxyl terminated polyol.

6. The sealant or adhesive according to claim 1, wherein the Part B aromatic diisocyanate monomer or polyisocyanate comprises at least one of toluene diisocyanate (TDI), methylene diphenyl diisocyanate (MDI), phenylene diisocyanate, diphenylmethane diisocyanate, polyphenylmethane polyisocyanate (polymeric MDI), naphthalene diisocyanate, triphenylmethane triisocyanate, diphenyl sulfone diisocyanate, toluene 2,4-diisocyanate, toluene 2,6-diisocyanate, naphthylene 1,5-diisocyanate, 4,4'-methylene diphenyl diisocyanate, 2,4'-methylene diphenyl diisocyanate, urethodione diisocyanate, hexahydrotolylene diisocyanate, 1-methoxyphenyl-2,4-diisocyanate, diphenylmethane-4,4'-diisocyanate, 4,4'-biphenylene di isocyanate, 3,3'-dimethoxy-4,4'-biphenyl diisocyanate, 3,3'-dimethyl-4,4'-biphenyl diisocyanate; 3,3'-dimethyldiphenylmethane-4,4'-diisocyanate, isomers, dimers and/or trimers of these diisocyanates, or mixtures thereof.

7. The sealant or adhesive according to claim 1, wherein the Part B prepolymer comprises the reaction product of at least one diol, triol or tetrol having a nominal weight average molecular weight of between 1,000 and 6,000 and aromatic diisocyanate or polyisocyanate.

8. The sealant or adhesive according to claim 1, wherein the Part B prepolymer comprises at least one of ethylene glycol, diethylene glycol, propylene glycol, dipropylene glycol, butane diol, glycerol, trimethylolpropane, triethanolamine, pentaerythritol or sorbitol.

9. The sealant or adhesive according to claim 1 wherein the theoretical % NCO of Part B is in the range of about 2 to about 10%.

10. The sealant or adhesive according to claim 1, wherein Part A additionally comprises a plasticizer.

11. The sealant or adhesive according to claim 1, wherein Part A additionally comprises at least one of catalyst, inorganic filler, colorant, antioxidant, UV light absorber, free radical initiator, adhesion promoter, calcium oxide, expandable microspheres, drying agent, organic filler, chain extender, UV stabilizer, light stabilizer, fungicide, mildewcide, biocide, fire retardant, surface additive, mineral oil, dispersing agent, defoaming agent, storage stabilizer, latent hardener, cure retarder, antifoaming agent, solvent, or mixtures thereof.

12. The sealant or adhesive according to claim 1, wherein the NCO/(OH+NH) ratio is about 0.9:1 to about 1.7:1.

13. A method of making a two part construction sealant or adhesive of claim 1 comprising Part A and Part B, the method comprising:
  a) providing a base component Part A and an activator component Part B, wherein Part A comprises at least one acrylate monomer; wherein the acrylate comprises at least one of trimethylol propane triacrylate, triacrylate, mixtures of triacrylate and diacrylate, or mixtures thereof, and a diol, triol and/or tetrol having a nominal weight average molecular weight of between 1,000 and 6,000; and Part B comprises aromatic diisocyanate monomer or polyisocyanate and an isocyanate terminated prepolymer of aromatic diisocyanate or polyisocyanate and polyol; and
  b) mixing the components of base component Part A with activator component Part B at a weight ratio of 5:1 to 1.8:1 to form a polyurethane sealant or adhesive reaction product;
  wherein the sealant or adhesive reaction product exhibits a paint adhesion of at least about 3B when tested according to ASTM D3359; a non-sag value of about 0.0-0.1 B/S when tested according to ASTM D-2202; and at least one of a 100% modulus of less than about 690 kPa (100 psi) in the presence of a plasticizer when tested according to ASTM D412; a tensile strength of about 690 kPa (100 psi) or greater when tested according to ASTM D412; or an elongation to break of about 250% or greater when tested according to ASTM D412.

14. The method of claim 13, further comprising applying the reaction product to a substrate.

15. The method of claim 14, wherein said applying is at least one of spraying, brushing, rolling, squeegeeing, scraping, troweling, or combinations thereof.

16. The method of claim 14, wherein the substrate is at least one of concrete, stone, metal, ceramic, glass, plastic, wood, asphalt, thermoplastic materials, thermoset materials, rubber, or composite materials.

17. The method of claim 13, further comprising applying paint to the surface of the sealant or adhesive, wherein the paint adheres to the surface of the sealant or adhesive with a rating of at least 3B when tested according to paint adhesion test ASTM D3359.

18. The method of claim 17, wherein the paint is at least one of latex paint, solvent-borne paint, or solvent-free paint.

\* \* \* \* \*